W. H. C. HIGGINS, Jr.
CARBURETER.
APPLICATION FILED JULY 9, 1910.

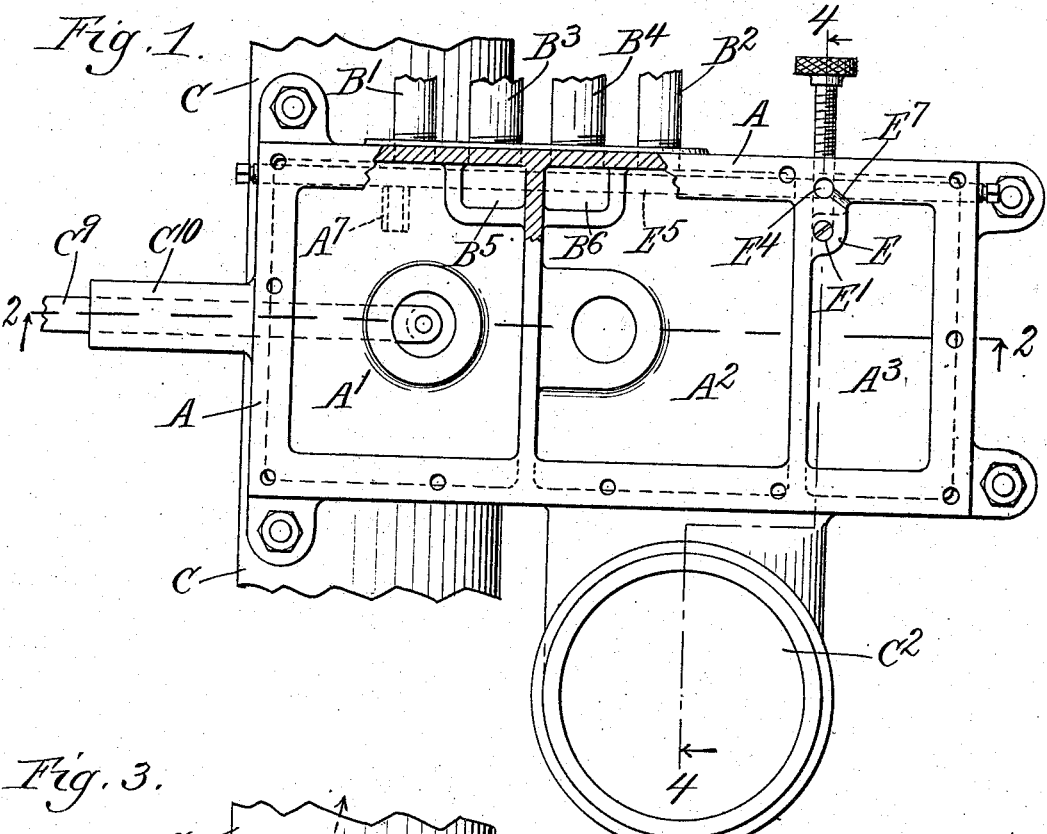
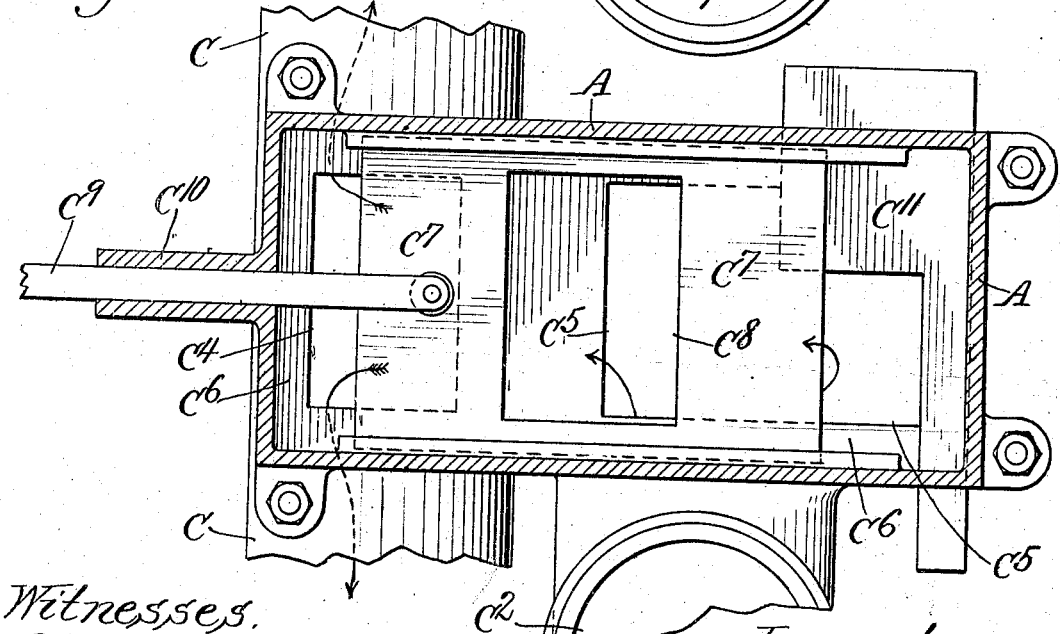

1,062,333.

Patented May 20, 1913.
3 SHEETS—SHEET 2.

Witnesses.
Edward T. Wray.
Lucy A. Falkenburg.

Inventor.
William H. C. Higgins Jr.
by Parker & Carter
Attorneys.

W. H. C. HIGGINS, Jr.
CARBURETER.
APPLICATION FILED JULY 9, 1910.
1,062,333.
Patented May 20, 1913.
3 SHEETS—SHEET 3.
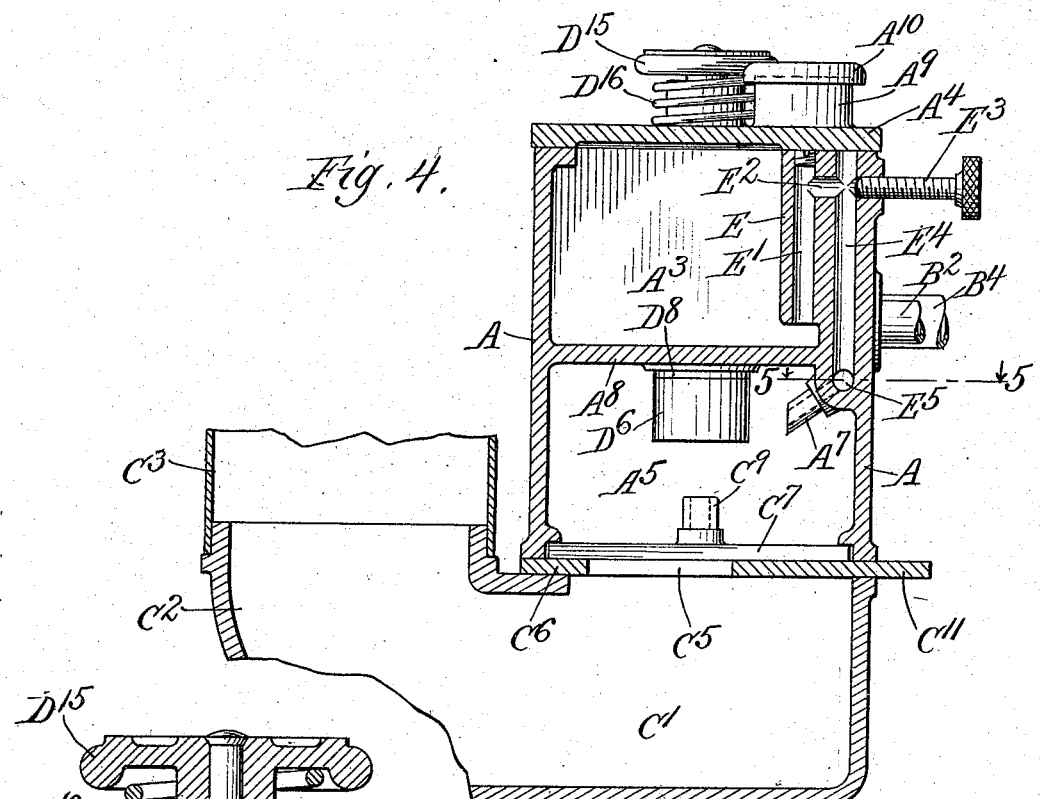
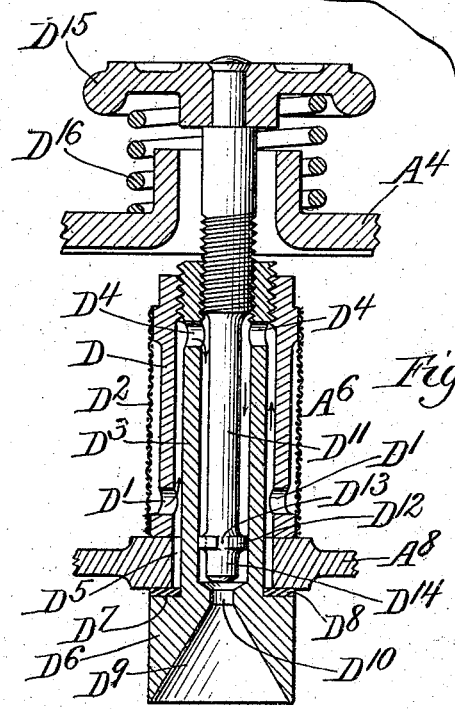
Witnesses.
Edward T. Wray
Lucy A. Falkenberg
Inventor.
William H. C. Higgins Jr.
by Parker & Carter
Attorneys.

UNITED STATES PATENT OFFICE.

WILLIAM H. C. HIGGINS, JR., OF LAPORTE, INDIANA.

CARBURETER.

1,062,333. Specification of Letters Patent. Patented May 20, 1913.

Application filed July 9, 1910. Serial No. 571,167.

*To all whom it may concern:*

Be it known that I, WILLIAM H. C. HIGGINS, Jr., a citizen of the United States, residing at Laporte, in the county of Laporte and State of Indiana, have invented a certain new and useful Improvement in Carbureters, of which the following is a specification.

My invention relates to improvements in carbureters and is illustrated in the accompanying drawings, wherein—

Figure 2:
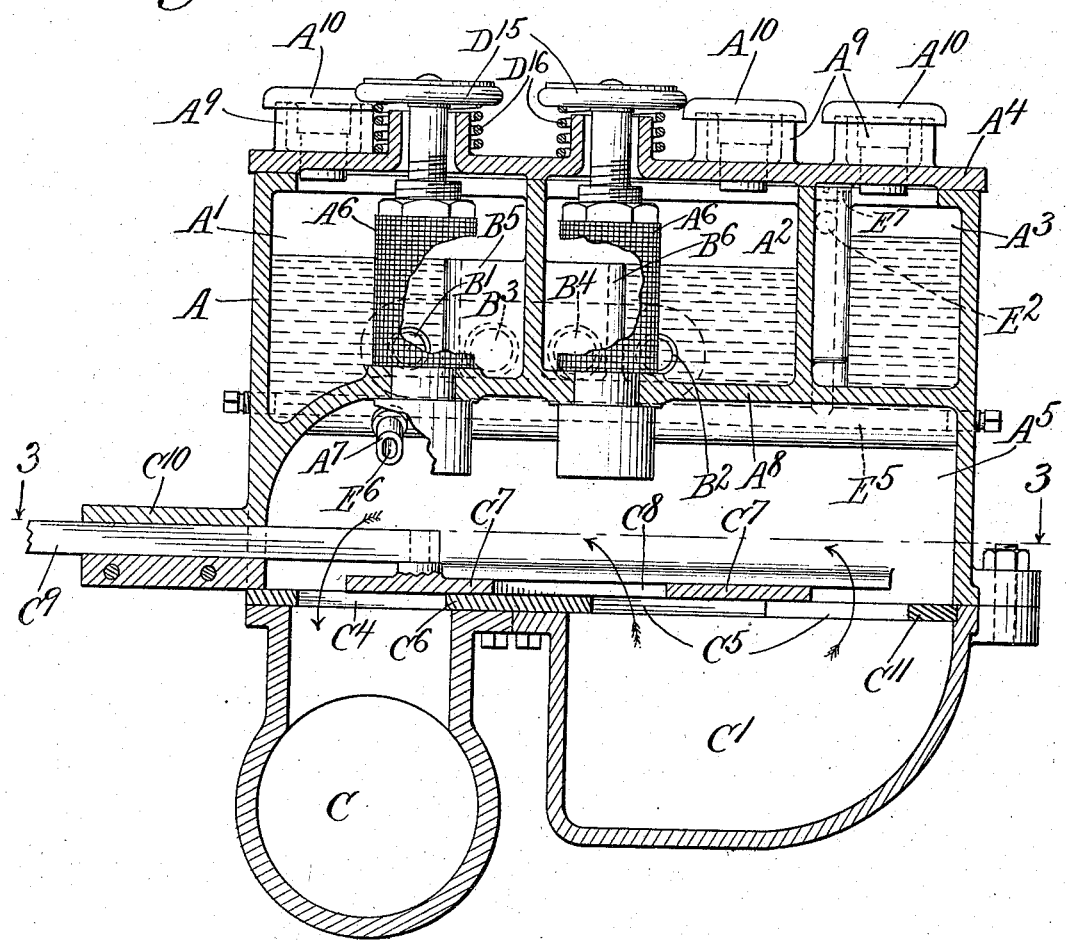
Figure 5:
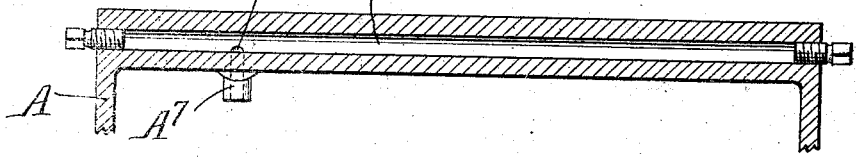

Figure 1 is a plan view in part section with parts removed; Fig. 2, a section along the line 2—2 of Fig. 1; Fig. 3, a section along the line 3—3 of Fig. 2; Fig. 4, a section along the line 4—4 of Fig. 1; Fig. 5, a section along the line 5—5 of Fig. 4; and Fig. 6, a detail of the needle valves.

Like parts are indicated by like letters throughout the several figures.

The casing A contains the liquid holding chambers $A^1$, $A^2$, $A^3$, which are closed by the removable cover $A^4$, and communicate with the carbureting chamber $A^5$ by means respectively of the valves $A^6$ and nozzle $A^7$ and are separated therefrom by the partition $A^8$. The cover $A^4$ contains the priming holes $A^9$ in communication with the liquid containing chambers and provided with the removable covers $A^{10}$.

The chambers $A^1$, $A^2$, are provided with the liquid supply pipes $B^1$, $B^2$, and the discharge pipes $B^3$, $B^4$, in communication with the wells $B^5$, $B^6$, to maintain the liquid in the chambers at a constant level.

The mixture discharge pipe C and the air intake chamber $C^1$ which is provided with the upwardly extending elbow $C^2$ in communication with the air pipe $C^3$, are in communication with the carbureting chamber $A^5$ through the mixture discharge opening $C^4$, and the air intake opening $C^5$ in the permanent valve seat $C^6$, upon which rides the slide valve $C^7$ having the rectangular perforation $C^8$ therein and being driven by the connecting rod $C^9$ in the sleeve $C^{10}$. The size of the air intake opening $C^5$ may be varied by means of the shutter $C^{11}$, which is adapted to be adjusted in a direction perpendicular to the path of the slide valve.

The needle valves $A^6$ which control the flow of oil and water from the chambers $A^1$ and $A^2$, consist of the cylinders D resting upon the partition $A^8$ and having near its base the perforations $D^1$ inclosed by the wire gauze $D^2$. The cylinder $D^3$ which has the perforations $D^4$ near its upper extremity, is concentrically mounted within the cylinder D, is in screw threaded engagement therewith at its upper end, and extends downwardly through the opening $D^5$ in the partition $A^8$ into the chamber $A^5$, being there provided with the enlargement $D^6$ having the shoulders $D^7$ carrying the packing $D^8$ to engage the partition $A^8$. The enlargement $D^6$ is provided with the conical opening $D^9$ in communication, by means of a passageway $D^{10}$, with the interior of the cylinder $D^3$. The cylinder $D^3$ contains the valve stem $D^{11}$ screw threaded therein, provided with the guiding collar $D^{12}$ having the apertures $D^{13}$ thereabout. The stem $D^{11}$ carries the valve member $D^{14}$ to control the passageway $D^{10}$, and may be adjusted by means of the hand wheel $D^{15}$, in opposition to the spring $D^{16}$ which bears at one end upon the cover $A^4$.

The chamber $A^3$ has at one corner the projection E extending from near its bottom and which contains the upwardly extending passageway $E^1$ in communication with the cross passageway $E^2$ controlled by a screw $E^3$ and which is in communication with the downwardly extending passageway $E^4$ which in turn communicates with the laterally extending passage $E^5$ in the wall of the casing which in turn is connected with the passage $E^6$ in the nozzle $A^7$. The slot $E^7$ leads from the top of the passageway $E^4$ immediately beneath the cover $A^4$ to the interior of the chamber $A^3$ and is of sufficient size to permit the passage of air to prevent the formation of a siphon and at the same time is not too great to prevent a suction of the fluid from the chamber $A^3$ owing to the action of the vacuum in the carbureting chamber.

I have shown in my drawings an operative device but it will be evident that numerous changes might be made in the size, shape and arrangement of parts without departing materially from the spirit of my invention, and I wish, therefore, that my drawings be regarded as in a sense diagrammatic, and that my application be not confined in scope to the identical device herewith shown.

While I have called this device a carbureter, in point of fact it is not, strictly or technically speaking, a carbureter in the sense in which that term may be employed. It is rather a device for mixing the elements so as to produce a mixture for internal combustion engines. In fact, the mixture as it issues from the so-called carbureter is not even combustible. The oil used is not vaporized in the so-called carbureting chamber but is simply sprayed into the same in a finely divided condition. The tendency of the oil when in that condition is to respond very sensibly to the law of gravity and hence the importance in my apparatus of arranging the parts so that the finely divided oil has no tendency to move in a direction antagonistic to the motion of the fluids through the chamber. For example, if the oil is sprayed into the upper end of a chamber in the lower end of which the incoming air is admitted, it is obvious that the air will tend to move upwardly and thence out of the chamber, while gravity will tend to move the finely divided particles of oil downwardly through the chamber in the opposite direction. Inasmuch as the motion is vibratory, there are times when there is but little upward movement of the air and at such times particles of oil have an opportunity to acquire momentum on their downward course and the result is unsatisfactory and imperfect action and the eventual flooding of the lower walls and bottom of the chamber. These tendencies are obviated by the arrangement shown or any similar arrangement wherein and whereby the oil tends always to move forward with the current or at least not in opposition thereto. If, for example, the oil is injected from above into the laterally or downwardly moving current of air, its particles will tend to move along with the current, and when the current is momentarily arrested these particles simply slightly shift their position in the current but do not move adversely to it.

The process involved consists in introducing oil in finely divided but not a vaporized state into the current preferably from above but so as to avoid such antagonistic movements as above referred to. Of course, the particular form of structure here shown is only one of many which could be utilized to carry out this process and bring about this result. It will be understood, of course, that the process relates to the use of an oil which is not volatile at ordinary operative temperatures, in other words, the use of kerosene and lower grade oils as distinguished from gasolene and the naphthas. Of course, the carbureter in this particular form will operate with gasolene and naphthas, but it is particularly adapted for use in connection with the heavier fuel oils referred to.

The use and operation of my invention are as follows: In providing a carbureter which is adapted to permit the use in a hydrocarbon engine of the heavier less inflammable oils such as kerosene, it is necessary to provide a priming fluid for starting the engine. This fuel usually takes the form of gasolene. I provide therefore a carbureter having a mixing chamber and integral therewith oil, water and gasolene chambers. The gasolene chamber communicates with the mixing chamber by means of a passageway in the wall of the carbureter, said passageway leading from the bottom of the gasolene chamber to the top of such chamber and down within the wall connecting finally with a nozzle in the mixing chamber. This passageway is adapted to be roughly controlled by means of a screw. The oil and water chambers each communicate with the mixing chamber by means of a needle valve which is made up of two concentric cylinders, the outer one perforated near its bottom and surrounded with a protecting gauze, the inner perforated near its top and having at its bottom a needle valve, which may be operated to adjust the supply. The connection between all three of the chambers and the mixing chamber is thus such a connection that the liquid is not permitted to flow freely owing to gravity but must be sucked from the chamber. The gasolene chamber is adapted to be filled only when the engine is to be started, whereas the oil and water chambers are adapted to be filled constantly, and to this end I provide feed pipes for each of them and an overflow pipe in each which is adapted to maintain the height of the liquid constant.

One side of the carbureting or mixing chamber consists of a permanent seat in which are located air intake and mixture outlet ports, the former adjustable in size by means of a movable shutter. The mixture is drawn from and through the carbureter by the engine, being controlled in amount by a slide valve riding upon the permanent valve seat which is adapted to vary the vacuum in the chamber to control the amount of hydrocarbon and water in the mixture. The water and hydrocarbon valves are so arranged that while the hydrocarbon valve responds to any vacuum the water valve responds only to a much greater vacuum, and these valves are so adjusted that as the vacuum increases owing to the increased load, the oil will increase until half load has been reached, at which point the water will commence to flow and from then on increase in relative rapidity until at full load there will be approximately as much water as hydrocarbon in the mixture.

It will be at once evident that the differential response of the water and oil nozzles to the varying vacuum may be easily obtained in any number of different ways. For instance, the opening in the nozzle may be varied to control the drag upon the liquid. The proportions of the nozzle itself might be changed. The liquid might be fed to one valve chamber more rapidly than to the other thus controlling the pressure, or different heights of liquid in the reservoirs might be used to vary the head. In fact, an infinite number of different methods might be adopted to render the nozzles differentially responsive to the vacuum.

When the engine is to be operated, the gasolene chamber is first filled and a mixture of air and gasolene made in the carbureter in the usual manner to drive the engine. As soon as the cylinder is heated up, the gasolene will be exhausted and first the oil valve, and as the load increases the water valve will become operated.

It will be understood, of course, that my invention is applicable to the use of any kind of liquid fuel such as oil, gasolene, alcohol and other similar fluids.

It will be evident that since my carbureter is to be used in connection with the heavier, less volatile, crude oils, it will be necessary to employ a lighter, more volatile, fuel when the engine is first started to heat up the cylinder as otherwise the heavier oils will not ignite, it being a well-known fact that heavier oils must be brought to a relatively high temperature and the cylinder and piston must be thoroughly heated before the engine can be made to burn these heavy oils. For this reason I employ gasolene or some other readily ignited fluid.

It will be observed that the arrangement of the needle valve is such that a certain siphoning effect might be expected which would tend to empty the fuel from the reservoir into the mixing chamber independent of the suction or vacuum set up therein. Experience shows that this effect is exceedingly slight owing probably to the frictional resistance and the very slight advantage of the discharge over the intake arm of the siphon together with the fact that, in all probability, the leakage of air around the screw-threaded connection between the needle valve stem and the sleeve is sufficient to break the vacuum. In any event, any siphoning discharge which takes place is relatively so much smaller than the discharge owing to the suction of the carbureting or mixing chamber, that the siphoning effect is negligible, and even if there was a siphoning tendency when the engine was idle, this would be of no importance since the fuel and water valves are habitually turned off when the engine is stopped.

With regard to the auxiliary fuel supply and the passages leading from the supply chamber to the mixing chamber, it will be evident that these passages are of different shape and of larger cross sectional area with respect to the area of their walls and therefore the siphoning action is much more prominent and for this reason it is necessary to provide some means for interrupting it, particularly in view of the fact that it is ordinarily not desirable to close this passage as it must commence to operate immediately the engine is started. It will be observed that the siphoning action is interrupted by the air passage at the top of the siphon and this passage, while of such small cross sectional area that sufficient air cannot enter to interrupt the suction due to the carbureter, is of sufficiently great cross sectional area to admit sufficient air to interrupt the siphoning action due merely to the weight of the column of material in the passage. The position of the air and water valves in this form of my invention is such that they discharge downwardly into the carbureting chamber where the path of the air is substantially horizontal between the air intake and mixture discharge ports adjacent one of the discharge nozzles and substantially vertical downwardly through the mixture discharge port adjacent the other nozzle, and the liquid which is sprayed or atomized from and by these nozzles is discharged in finely divided particles into this air current. The reciprocatory action of the engine and its intermittent suction strokes draws the mixture from the carbureter intermittently and there are periods between the suction strokes when the air will be substantially at rest. During these periods the liquid particles will not be acted upon by the air current but will be allowed to fall freely either into and out through the mixture discharge port or else toward the bottom of the carbureter. However, the frequency of the pulsations will be so great that these particles will not have time under ordinary circumstances to reach the bottom of the chamber before they are again acted upon by the air current and the velocity which they acquire will always be either at right angles to the direction in which they are drawn by the air or else parallel with it, and they will never at any time move in a direction contrary to the direction which the air current tends to draw them and, therefore, no power will be lost in the carbureter in reversing the movement of these particles.

It will be evident that in a carbureter such as this which is primarily designed for use with the heavier non-volatile hydrocarbons it is important that the atomized liquid particles will be so fed to the carbureting chamber and to the engine that they will never through the action of gravity move in a direction opposed to the direction which they move toward the engine. These particles are, of course, of greater specific gravity than the air and, therefore, it is advantageous to so arrange the carbureter with respect to the engine and to so arrange the fuel supply nozzles with respect to the carbureter and the engine that the finely divided fuel particles may be conveyed by the air current to the engine with a minimum change in direction since, if the particles are carried around sharp bends, they will be thrown out of the air current owing to their greater density.

I claim:

1. A carbureter comprising a mixing chamber, a plurality of fluid containing reservoirs integral with and communicating with said chamber, a passageway leading from the bottom of one of said reservoirs upwardly through the wall of the carbureter, downwardly and laterally within the casing wall to the mixing chamber and means for interrupting the automatic action of the siphon-like passage so formed.

2. A carbureter comprising a mixing chamber, a plurality of liquid containing reservoirs integral with and communicating with said chamber, and a siphon leading from one of said reservoirs to the mixing chamber.

3. A carbureter comprising a mixing chamber, a plurality of liquid containing reservoirs integral with and communicating with said chamber, and a siphon leading from one of said reservoirs to the mixing chamber, said siphon perforated at its uppermost point to interrupt the siphon action.

4. A carbureter comprising a vacuum chamber, air inlet and mixture discharge passages controlled by a single integral valve, fuel and water reservoirs integral with said carbureter and discharging into said carbureting chamber, valves controlling the supply from said reservoirs to said reservoir, and an auxiliary priming fluid chamber integral with said carbureter and a siphon like connection between said carbureting chamber and said priming fluid reservoir.

5. In a carbureter, a vacuum carbureter chamber having fuel and water inlets each having a nozzle opening into the carbureting chamber separate and distinct one from the other and adapted to vary their feeds responsive to variations in the vacuum in the carbureter chamber, an air inlet and a mixture outlet in combination with means for simultaneously but unequally varying both of their respective areas during operation, one fluid reservoir placed higher than its nozzle and provided with a passage from the nozzle to the reservoir through which the fluid is fed only in response to a negative pressure in said vacuum chamber.

WILLIAM H. C. HIGGINS, Jr.

Witnesses:
J. A. KIRSEH,
CHAS. W. BEALL.

Copies of this patent may be obtained for five cents each, by addressing the "Commissioner of Patents, Washington, D. C."